United States Patent Office 3,063,727
Patented Nov. 13, 1962

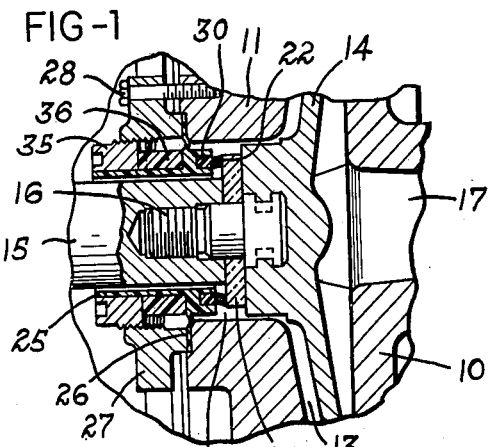
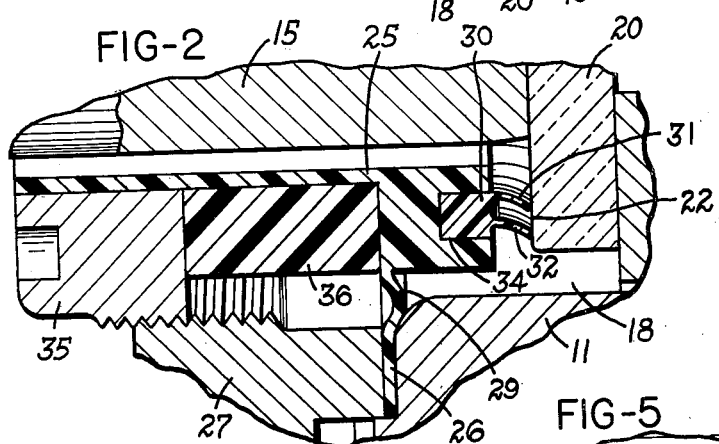
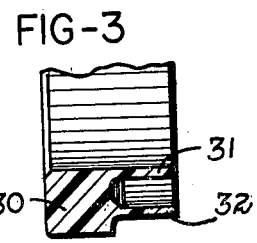
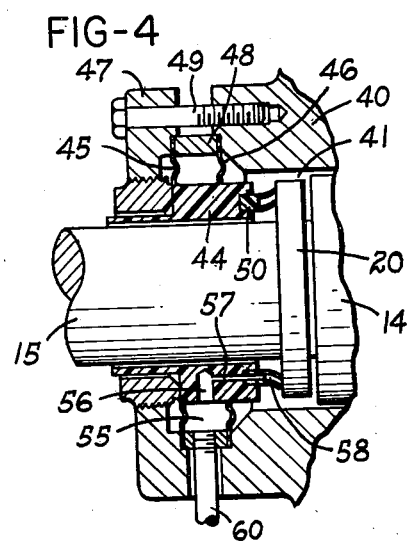
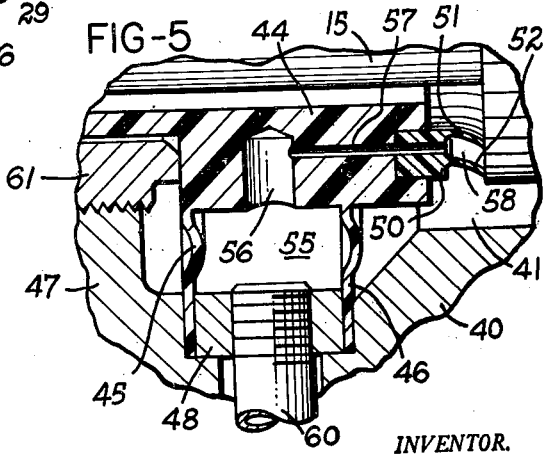
INVENTOR.
ROBERT C. SCHENCK

3,063,727
ROTARY SEALS
Robert C. Schenck, Dayton, Ohio, assignor to The Duriron Company, Inc., Dayton, Ohio, a corporation of New York
Filed Nov. 18, 1958, Ser. No. 774,655
5 Claims. (Cl. 277—74)

This invention relates to rotary seals.

It is a primary object of the invention to provide a novel and improved rotary seal of the stuffing box type for a shaft wherein the sealing engagement of relatively rotating sealing members takes place along surfaces extending radially of the shaft, wherein the relatively rotating sealing members are adjustable axially of the shaft to regulate the sealing pressure therebetween, and which at the same time is of such construction as to eliminate the necessity of springs for maintaining sealing engagement between the relatively rotating sealing members.

Another object of the invention is to provide a rotary seal of the stuffing box type for the junction between a shaft and a chamber maintained at superatmospheric pressure wherein the relatively rotating sealing members comprise a surface extending radially of the shaft and a tubular seal member arranged in such manner as to engage the radially extending surface under pressure causing deformation thereof along the surface into an annular lip which is maintained in sealing engagement with the radial surface by the pressure within the sealed chamber.

An additional object of the invention is to provide a rotary seal of the stuffing box type having one or more of the characteristics outlined above which is especially adapted for use at the junction between the shaft and a chamber containing a liquid slurry under superatmospheric pressure, and which incorporates provision for effecting a controlled flow of flushing liquid into the sealed chamber between the relatively rotating sealing members to prevent possible interference with the sealing action as the result of the entry of solid particles in the slurry between the sealing members.

It is also an object of the invention to provide rotary seals having one or more of the characteristics outlined above and incorporating lip seal members constructed of a plastic material having natural properties of resilience, chemical inertness, and low coefficient of friction which enhance the practical value of the seal.

Other objects and advantages of the invention will be apparent from the following description, the accompanying drawing and the appended claims.

In the drawing—

FIG. 1 is a fragmentary view in axial section showing a rotary seal constructed in accordance with the invention for the junction between the shaft and casing of a centrifugal pump;

FIG. 2 is an enlarged fragment of FIG. 1;

FIG. 3 is a fragmentary section of a detailed part in the seal of FIGS. 1 and 2;

FIG. 4 is a fragmentary section showing a seal in accordance with the invention incorporating provision for introducing a flushing liquid between the relatively rotating sealing surfaces; and FIG. 5 is an enlarged fragment of FIG. 4.

Referring to the drawing, which illustrates preferred embodiments of the invention, FIG. 1 shows fragments of the parts 10 and 11 of a pump body which define the pumping chamber 13 wherein the impeller 14 operates on the end of the drive shaft 15 to which it is secured by the bolted connection shown at 16. The inlet to the pumping chamber is shown fragmentarily at 17, and it will be understood in accordance with the usual conditions of operation of a centrifugal pump, that the opening 18 in the part 11 through which the shaft extends into the pumping chamber, and which is in effect a portion of the pumping chamber, is under superatmospheric pressure. The present invention is directed primarily to a rotary seal assembly for sealing against the escape of this pressure to the outside atmosphere through this opening 18 between the shaft 15 and the surrounding wall portion of the part 11.

The rotary member of the seal assembly is provided by means defining a radially extending surface carried by the impeller 14 and shaft 15, and it is shown as a sealing disk 20 clamped between the impeller 14 and the end of the shaft 15 by the bolted connection 16 and of larger diameter than the shaft to provide the desired annular sealing surface 22. The member 20 should be constructed of a hard and chemically inert material, such as a ceramic material, and if the impeller itself is formed of a suitably hard and corrosion resistant material, the surface 22 may take the form of an annular shoulder portion of the impeller.

The rotary portion of the seal assembly includes a sleeve 25 arranged in loosely surrounding relation with the shaft 15 and including a radially extending diaphragm 26 which is integral therewith or otherwise secured thereto and which is clamped between the part 11 and a flange 27 secured to the part 11 by bolts 28. As shown in FIG. 2, the proportions of these parts are such that the sleeve 25 is capable of limited movement axially of the shaft with respect to the pump body 10—11, and this result is facilitated by the inclusion of an annular corrugation 29 in the diaphragm. The sleeve 25 and diaphragm 26 may be formed of any material providing the flexible characteristics described, and satisfactory results have been obtained by molding the diaphragm integrally with the sleeve from a fluorocarbon resin such as one of the materials sold under the trade name Teflon.

As best seen in FIG. 2, the sleeve 25 includes a thickened inner end portion which carries in its inner face a sealing ring 30, and this ring 30 in turn includes a pair of integral cylindrical skirt portions 31 and 32 which extend therefrom in spaced concentric relation toward the sealing surface 22. Preferred results have been obtained in the practice of the invention with this sealing ring 30 molded of a Teflon material because it possesses the desired properties of stiffness and low coefficient of friction while being capable of limited resilient deflection and also being extremely chemically inert and thus very suitable in pumps handling corrosive liquids. If the sleeve 25 is also of the same Teflon material, the ring 30 may be molded integrally therewith, but it is quite satisfactory to make use of two parts separated as shown and to mount the ring 30 in the sleeve 25 by force fitting in an appropriately proportioned annular groove 34 in the end face of the sleeve.

Provision is made for urging the sleeve 25 inwardly of the opening 18 sufficiently to cause radially outward deflection of the skirts 30 and 31 against the surface 22 to a position wherein the edge portions of the skirts form annular lips as shown in FIG. 2. This result is obtained by means of an adjusting nut 35 threaded in the flange 27 and cooperating with an annular spacer 36 which seats on the outwardly facing shoulder 37 on the thickened portion of the sleeve 25. It will be apparent that this spacer 36 could also be molded integrally with the sleeve 25 if desired, but this is not essential since it is not exposed to the material within the pumping chamber and therefore need not be composed of a material which is inert to whatever liquid might be present in the pumping chamber as is desired for the parts 25 and 30.

With the parts constructed and arranged as described, the outward deflection of the skirts 31 and 32 into annular lips as shown in FIG. 2 causes these lips to present an annular surface overlying the sealing surface 22 and facing toward the pressure liquid within the pumping chamber 31 and opening 18. Since this liquid is under greater pressure than the outside atmosphere, the pressure differential will cause it to bear against the outer surface of the skirt 32 and to urge it more tightly into sealing engagement with the surface 22 supplementing the sealing engagement already established by the resilient deflection of the skirt itself. In fact, adequate sealing for normal operation may be obtained in this manner with only the outer skirt 32, but the inner skirt 31 provides insurance against leakage, since it in effect backs up the skirt 32 and is similarly urged into increased sealing engagement with the surface 22 by any liquid which may leak into engagement therewith.

FIGS. 4 and 5 show a modified construction of the seal of FIGS. 1–3 which is especially adapted for use in a pump handling a liquid slurry containing solid particles, and which incorporates provision for continuously introducing a flushing liquid between the relatively moving sealing surfaces to insure that none of the solid particles in the slurry can interfere with the maintained sealing action by entry between these sealing surfaces. The impeller 14, shaft 15 and sealing disk 20 correspond to the similarly numbered parts in FIGS. 1 and 2, and the body part 40 corresponds to the body part 11 and includes an inner wall defining the opening 41 through which the shaft extends into the pumping chamber in the same manner as the opening 18 in FIGS. 1 and 2.

The sleeve 44 in FIGS. 4 and 5 is similar in function to the sleeve 25, but it includes a pair of corrugated diaphragms 45 and 46 which are clamped in sealed relation with the cover plate 40 by a flange 47 in cooperation with a spacer ring 48 and bolts 49. The sleeve 44 carries a sealing ring 50 in its inner face which is similar in construction to the sealing ring 30 and includes similar integral skirts 51 and 52. The diaphragms 44 and 45 thus cooperate with the spacer ring 47 and the body of the sleeve 44 to define an annular chamber 55, and bores 56 and 57 connect this chamber with the annular chamber 58 between the skirt portions 51 and 52 of the sealing ring 50. A pipe or tube 60 is connected to the ring 47 to conduct the desired flushing liquid from a pressure source (not shown) to the chamber 55 from which it can enter the chamber 58 by way of the bores 56 and 57.

The adjusting nut 61 is threaded in the flange 46 similarly to the adjusting nut 35 to urge the sleeve 44 inwardly of the opening 41 and thereby to effect the desired outward deflection of the skirts 51 and 52. The lip portion of the skirt 52 will therefore tend to be held in sealing engagement with the disk 20 by the pressure liquid within the opening 41 in the same manner as described in connection with FIGS. 1–3. However, if the desired flushing liquid is supplied to the chamber 55 through the pipe 60 at a pressure slightly higher than the normal pressure in the opening 41, this liquid will flow between the skirt 52 and disk 20 at a correspondingly low volumetric rate which at the same time is sufficient to flush back into the pumping chamber any solid particles from the slurry present in the opening 41 which might otherwise work their way between the skirt 52 and disk 20. At the same time, since the flushing liquid is similarly at superatmospheric pressure, it will act on the inner skirt 51 to maintain it in tight sealing engagement with the disk 20 to prevent escape of the flushing liquid to the outside.

The invention thus provides rotary seals of outstanding simplicity, particularly as compared with conventional rotary and stuffing box seals, and extensive tests have established that seals constructed as described herein give efficient service over a long useful life. In particular, it will be noted that the seals of the invention eliminate the necessity for any metallic springs for maintaining sealing engagement between the relatively rotating sealing parts, and also that there are wide manufacturing tolerances in the parts of these seals, with none of the dimensions being critical so long as the general operating relationship of the parts is maintained in the manner described. As noted, the seals of the invention are especially applicable in the handling of corrosive liquids, and also they remain substantially unaffected over a wide temperature range while at the same time imparting very slight frictional loads on the relatively rotating parts, this last result being contributed to both by the small areas of contact between these parts as well as the low frictional properties of the fluorocarbon resin materials which have been found to be preferred in the practice of the invention.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A rotary seal assembly for use between a rotary shaft and a wall defining an opening in a body through which said shaft extends into a chamber which is at superatmospheric pressure, comprising means defining a radially extending sealing surface on said shaft, a sleeve loosely surrounding said shaft axially of said sealing surface, a pair of cylindrical seal members carried by said sleeve in concentric relation to define an annular space therebetween and extending axially from said sleeve toward said sealing surface, said seal members being composed of a low friction material capable of limited resilient deflection, each of said seal members being of a substantially greater dimension in the direction parallel with said shaft than in thickness to provide for distortion thereof radially outwardly of said shaft in response to movement thereof with said sleeve into engagement with said sealing surface, means for forming a sealed connection between said sleeve and said wall providing for limited movement of said sleeve axially of said shaft, means carried by said body for moving said sleeve axially of said opening sufficiently to cause radially outward deflection of the axially inner edge portions of said seal members against said sealing surface to positions wherein said edge portions form a pair of concentric annular lips overlying said sealing surface with the outer of said lips held in sealing engagement with said surface by said superatmospheric pressure, and means for introducing a flushing liquid from outside said body into said annular space at a pressure higher than said superatmospheric pressure therein and at a rate effecting a small flow thereof into said chamber between said outer lip and said sealing surface while holding the inner said lip in maintained sealing engagement with said surface.

2. A rotary seal assembly for use between a rotary shaft and the wall defining an opening in a body through which said shaft extends into a chamber which is at superatmospheric pressure, comprising means defining a radially extending sealing surface on said shaft, a sleeve loosely surrounding said shaft axially outwardly of said sealing surface, a flexible annular diaphragm having a sealed connection with the outer surface of said sleeve, means securing the outer periphery of said diaphragm in sealed relation with said wall with the inner portion of said diaphragm free to support said sleeve for limited movement axially of said shaft, a pair of cylindrical seal members carried by said sleeve in concentric spaced relation to define an annular space therebetween and extending therefrom toward said sealing surface, said seal members being composed of a low friction material capable of limited resilient deflection, each of said seal members being of a substantially greater dimension in the direction parallel with said shaft than in thickness to provide for distortion thereof radially outwardly of said shaft in response to movement thereof with said sleeve into engagement with said sealing surface, means carried by said body for moving said sleeve axially of said opening sufficiently to cause radially outward deflection of said seal members against said sealing surface to positions wherein said seal members form a pair of concentric annular lips overlying said sealing surface with the outer of said lips held in sealing engagement with said surface by said superatmospheric pressure, and means for introducing a flushing liquid into said annular space at a pressure higher than said superatmospheric pressure and at a rate effecting a small flow thereof into said chamber between said outer lip and said sealing surface while holding the inner said lip in maintained sealing engagement with said surface.

3. A rotary seal assembly for use between a rotary shaft and the wall defining an opening in a body through which said shaft extends into a chamber which is at superatmospheric pressure, comprising means defining a radially extending sealing surface on said shaft, a sleeve loosely surrounding said shaft axially outwardly of said sealing surface, a pair of flexible annular diaphragms having sealed connections with the outer surface of said sleeve in axial spaced relation, means for securing the outer peripheries of said diaphragms in sealed relation with said wall with the inner portions of said diaphragm maintained in spaced relation defining a compartment therebetween and with said inner portions of said diaphragms free to support said sleeve for limited movement axially of said shaft, a pair of cylindrical seal members carried by said sleeve in concentric spaced relation to define an annular space therebetween and extending axially from said sleeve toward said sealing surface, said seal members being composed of a low friction material capable of limited resilient deflection, each of said seal members being of a substantially greater dimension in the direction parallel with said shaft than in thickness to provide for distortion thereof radially outwardly of said shaft in response to movement thereof with said sleeve into engagement with said sealing surface, means carried by said body for moving said sleeve axially of said opening sufficiently to cause radially outward deflection of said seal members against said sealing surface to positions wherein the axially inner edge portions of said seal members form a pair of concentric annular lips overlying said sealing surface with the outer of said lips held in sealing engagement with said surface by said superatmospheric pressure, means in said sleeve forming a passageway from said compartment to said annular space between said seal members, and means for introducing a flushing liquid to said space through said passageway at a pressure higher than said superatmospheric pressure and at a rate effecting a small flow thereof into said chamber between said outer lip and said sealing surface while holding the inner said lip in maintained sealing engagement with said surface.

4. A rotary seal assembly for use between a relatively rotatable shaft and the wall defining an opening in a body through which said shaft extends into a chamber which is at superatmospheric pressure, comprising means defining a radially extending sealing surface on said shaft, a sleeve loosely surrounding said shaft axially outwardly of said sealing surface, a sealing ring secured to said sleeve and including a pair of cylindrical skirts in concentric relation extending axially therefrom toward said sealing surface in spaced concentric relation, said ring being composed of a low friction material capable of limited resilient deflection, each of said skirts being of a substantially greater dimension in the direction parallel with said shaft than in thickness to provide for distortion thereof radially outwardly of said shaft in response to movement thereof with said sleeve into engagement with said sealing surface, means for forming a sealed connection between said sleeve and said wall providing for limited movement of said sleeve axially of said shaft, means carried by said wall for engaging said sleeve to move said sleeve axially of said opening sufficiently to cause radially outward deflection of said skirts against said sealing surface to positions wherein said skirts form a pair of concentric annular lips with the outer of said lips held in sealing engagement with said surface by said superatmospheric pressure, and means for introducing a flushing liquid between said skirts at a superatmospheric pressure lower than said pressure in said chamber and at a rate effecting a small flow thereof into said chamber between the outer said lip and said sealing surface while holding the inner said lip in maintained sealing engagement with said surface.

5. A rotary seal assembly for use between a relatively rotatable shaft and the wall defining an opening in a body through which said shaft extends into a chamber which is at superatmospheric pressure, comprising means defining a radially extending sealing surface on said shaft, a sleeve loosely surrounding said shaft axially outwardly of said sealing surface, a pair of axially spaced flexible annular diaphragms having sealed connections with said sleeve, means for securing the outer peripheries of said diaphragms in sealed relation with said wall with the inner portions of said diaphragms maintained in spaced relation defining a compartment therebetween and with said inner portions of said diaphragms free to support said sleeve for limited movement axially of said shaft, a sealing ring secured to said sleeve and including a pair of concentric skirts extending therefrom axially toward said sealing surface, said ring being composed of a low friction material capable of limited resilient deflection, each of said skirts being of a substantially greater dimension in the direction parallel with said shaft than in thickness to provide for distortion thereof radially outwardly of said shaft in response to movement thereof with said sleeve into engagement with said sealing surface, means carried by said wall for moving said sleeve axially of said opening sufficiently to cause radially outward deflection of said skirts against said sealing surface to positions wherein said skirts form a pair of concentric annular lips with the outer of said lips held in sealing engagement with said surface by said superatmospheric pressure, means in said sleeve and said ring forming a passageway from said compartment to the space between said skirts, and means for introducing a flushing liquid to said compartment at a superatmospheric pressure lower than said chamber pressure and at a rate effecting a small flow thereof between the outer said lip and said sealing surface while holding the inner said lip in maintained sealing engagement with said surface.

References Cited in the file of this patent

UNITED STATES PATENTS

| 1,315,822 | Doran | Sept. 9, 1919 |
| 2,270,811 | Leonard | Jan. 20, 1942 |
| 2,545,485 | Meisenbury | Mar. 20, 1951 |
| 2,679,412 | Whitfield | May 25, 1954 |
| 2,736,265 | Higgins | Feb. 28, 1956 |
| 2,736,585 | Reising | Feb. 28, 1956 |
| 2,743,121 | Stevens | Apr. 24, 1956 |
| 2,744,772 | Amirault et al. | May 8, 1956 |
| 2,902,301 | Daeschner | Sept. 1, 1959 |

UNITED STATES PATENT OFFICE
CERTIFICATE OF CORRECTION

Patent No. 3,063,727　　　　　　　　　　　　　November 13, 1962

Robert C. Schenck

It is hereby certified that error appears in the above numbered patent requiring correction and that the said Letters Patent should read as corrected below.

Column 3, line 5, for "31" read -- 13 --; column 6, lines 14 and 51, for "lower" read -- higher --.

Signed and sealed this 5th day of November 1963.

(SEAL)
Attest:
ERNEST W. SWIDER

EDWIN L. REYNOLDS

Attesting Officer

Acting Commissioner of Patents